United States Patent
Verronneau et al.

(10) Patent No.: US 7,246,937 B2
(45) Date of Patent: Jul. 24, 2007

(54) GOLF BALL MIXING AND DISPENSING APPARATUS

(75) Inventors: Mark R. Verronneau, Acushnet, MA (US); Richard T. Dix, Marion, MA (US); David W. Sauerbrey, Marion, MA (US); Christopher Cavallaro, Lakeville, MA (US); Paul A. Puniello, Bristol, RI (US)

(73) Assignee: Acushnet Company, Fairhaven, MA (US)

( * ) Notice: Subject to any disclaimer, the term of this patent is extended or adjusted under 35 U.S.C. 154(b) by 520 days.

(21) Appl. No.: 10/862,834

(22) Filed: Jun. 7, 2004

(65) Prior Publication Data

US 2005/0270898 A1 Dec. 8, 2005

(51) Int. Cl.
*B01F 7/24* (2006.01)
*B01F 15/02* (2006.01)
*B01F 15/06* (2006.01)
*B29C 45/18* (2006.01)
*B29C 31/00* (2006.01)

(52) U.S. Cl. ........... 366/145; 366/149; 366/184; 366/194; 366/320; 425/543; 425/549; 425/574; 425/572

(58) Field of Classification Search ......... 366/320, 366/138, 147, 149, 145, 184, 194; 425/116, 425/208

See application file for complete search history.

(56) References Cited

U.S. PATENT DOCUMENTS

| | | | | |
|---|---|---|---|---|
| 3,051,455 A | * | 8/1962 | Magester | 366/172.1 |
| 4,022,438 A | * | 5/1977 | Shishido et al. | 366/310 |
| 4,165,187 A | * | 8/1979 | James | 425/159 |
| 4,350,803 A | * | 9/1982 | Penn | 528/10 |
| 4,460,278 A | * | 7/1984 | Matsubara et al. | 366/149 |
| 4,953,633 A | * | 9/1990 | Hermans | 165/109.1 |
| 5,046,548 A | * | 9/1991 | Tilly | 165/140 |
| 5,171,557 A | * | 12/1992 | Crosbie et al. | 423/344 |
| 2005/0269746 A1 | * | 12/2005 | Puniello et al. | 264/328.14 |
| 2005/0270898 A1 | * | 12/2005 | Verronneau et al. | 366/149 |

* cited by examiner

*Primary Examiner*—Tony G. Soohoo
(74) *Attorney, Agent, or Firm*—D. Michael Burns

(57) ABSTRACT

The present invention provides an apparatus and system for mixing castable polyurethanes for dispensing into a golf ball mold for application to a golf ball sub-assembly. The apparatus comprises a mixing block for merging together at least two polyurethane components, then a temperature control chamber to remove excess heat that is produced by the exothermic reaction resulting from the mixing of the urethane components. The mixing of the components is by passing the components through a tortuous mixing path created by a disposable static mixer element. The mixed components are dispensed into the golf ball mold by a multiple lead nozzle assembly.

5 Claims, 3 Drawing Sheets

GOLF BALL MIXING AND DISPENSING APPARATUS

FIELD OF THE INVENTION

This invention relates generally to an apparatus for mixing of castable polyurethanes, and, more particularly, to an improved apparatus for temperature control and dispensing of the mixture.

BACKGROUND OF THE INVENTION

In castable flow molding processes employing a plurality of castable polyurethane components, the homogeneity and the quality of the molded material is mainly determined by the mixing operation which immediately precedes the molding.

For example, after an amount of time in which the reactants come into contact, a polymerization reaction process begins producing the moldable material. Many times, striae form within the moldable material that is visible. The striae are a result of poor mixing which inhibits the quality of the material. Therefore, it is desirable to produce a mixture which is as homogeneous as possible, in the shortest possible time, in order to bring about a uniform reaction to avoid the formation of striae. However, there is an additional difficulty presented in mixing reactive components in the case of polyurethane, in that the two components, i.e., polyol and the isocyanate, have substantially different viscosities.

The use of known mixing processes does not lead to the desired result for producing a high quality polyurethane material. For example, with some processes that employ static mixers that make use of various known mixers for mixing liquids in the laminar flow regime, it is found that a relatively long mixing length is needed to produce sufficient mixing. Often, the mixture requires a relatively long time to pass through this long mixing length, meanwhile, the polymerization process has already begun. Due to the quick setting characteristics of polyurethane, the material will gel or "set up" within the mixer instead of being discharged into the usual succession of molds. The molds are generally moved past the discharge of the mixer in time relation to the discharge. If, for any reason, a slight delay or decrease in the flow rate of the mixture through the mixer occurs, the mixture gels in portions of the mixer and restricts flow, thus further slowing the discharge and resulting in the entire mixer being clogged with hard setting components. An improvement in slowing down the gel time is necessary to allow the mixture to progress through the system.

Generally, static mixers are in the form of a tubular chamber, with a rigid static mixing device disposed therein. Because of the very nature of the static mixer, the mixer cannot be cleaned readily once any appreciable quantity of material has gelled in the various mixing elements which form the static mixing device. Attempts have been made to clean the static mixer, but due to the cementing and interlocking effects of the material this approach has proven impractical. Therefore, available static mixers perform poorly in practice because the mixer may only be used, in some instances, for 15 to 30 minutes before "plugging-up".

If in place of the static mixer, a dynamic mixer may be employed with the aim of reducing the mixing time. While the results generally improve the quality of mixing, the temperature of the reaction mixture may be increased by frictional and shear heating, and local fractions of the mixture which can be generated in an advanced state of polymerization must be eliminated. Consequently, when dynamic mixers are used, significant improvements must be made towards controlling the exothermic temperatures. Additionally, caution must be taken to insure that the dynamic mixer does not introduce pockets of gas in the form of air bubbles into the moldable material, which may lead to poor quality. Moreover, dynamic mixers may require frequent flushing with solvents resulting in a sludge material which has to be disposed of.

The present invention is directed to overcoming one or more of the problems as set forth above.

SUMMARY OF THE INVENTION

The present invention is directed to an apparatus for mixing and dispensing of urethane components for application to a golf ball sub-assembly. The apparatus comprises a rear mixing block for receiving at least two components, a system for pumping the urethane components through the mixing block, a mixer body having a middle portion that defines a bore extending axially along its longitudinal axis with a plastic disposable dynamic mixer element disposed in the bore for mixing the components, a temperature control chamber encompassing the mixer body for controlling heat generated by the exothermic reaction that is created when the urethane components combine and mix, and a nozzle assembly for dispensing the mixed urethane components into a mold cavity containing the golf ball sub-assembly.

Employed in the present invention is a dynamic mixer element having a structure of multiple segments at a 90° relationship to each to create a tortuous and effective mixing path.

Another embodiment of the apparatus has for a temperature control chamber, a mixing housing encompassed by a cooling jacket. The mixing housing has a middle portion defining a bore extending axially therein with means disposed in the bore for mixing the components. The mixing housing has a helical groove extending generally about its outer perimeter and along the longitudinal length of the housing, and having a water inlet and a water outlet for permitting the cooling water to circulate about the housing. The cooling jacket surrounds the mixing housing in a relatively tight sealing relationship to the housing, and provides a means for controlling the heat generated by the exothermic reaction of the urethane components combining and mixing.

The apparatus is completed by a nozzle assembly which utilizes pneumatic pressure to dispense the mixed urethane components into a mold cavities containing a golf ball sub-assemblies.

The present invention provides for a process to mix urethane reactive components into homogenous material. The process comprises pumping bulk materials through the apparatus wherein they are mixed by a plastic disposable mixer element, while the temperature of the mixing components (which emit a relatively large amount of heat due to their exothermic reaction), is controlled. The mixed urethane composition is dispensed into a golf ball mold cavity for forming around a golf ball sub-assembly.

BRIEF DESCRIPTION OF THE DRAWINGS

For a better understanding of the present invention, reference may be made to the accompanying drawings in which:

FIG. 1a is cutout segmented view of the mixer element;

DETAILED DESCRIPTION OF THE DISCLOSURE

Figure 1:
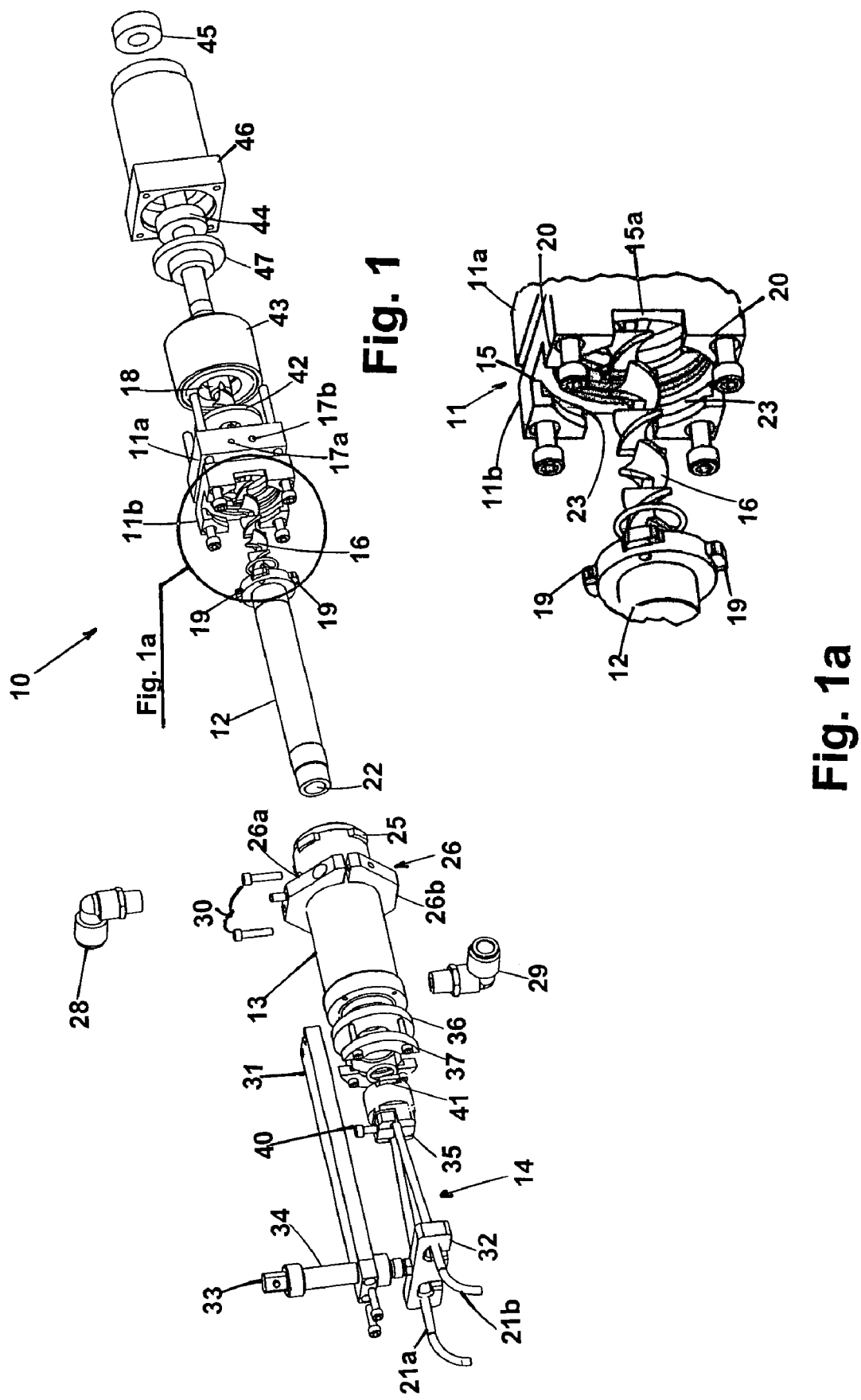
FIG. 1 is an expanded view of the apparatus.
Figure 2:
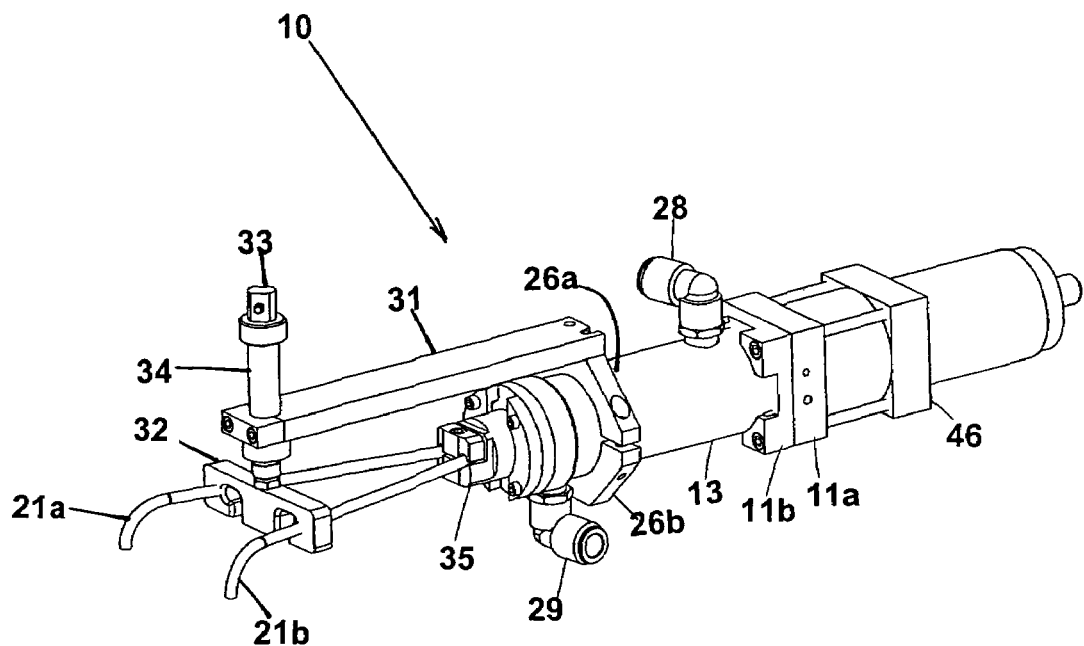
FIG. 2 is a perspective view of the completed apparatus of FIG. 1.
Figure 3:
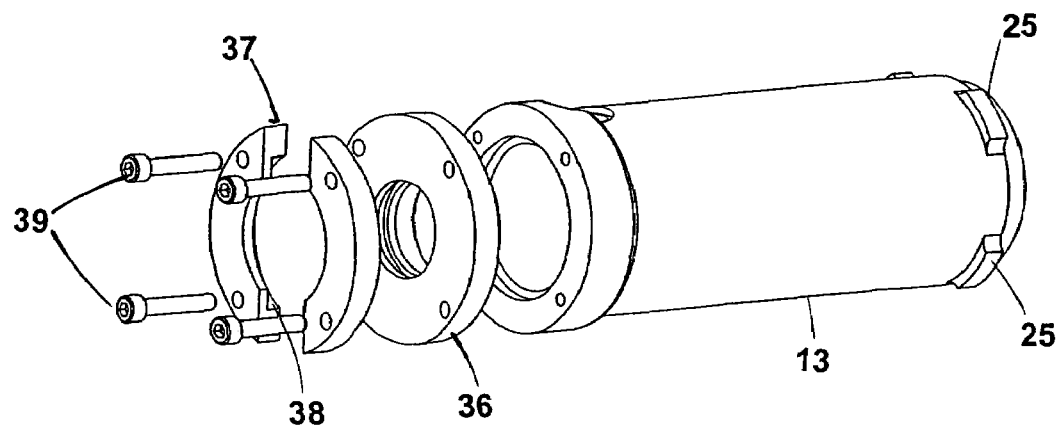
FIG. 3 a perspective of the temperature control chamber of the invention.

Referring to FIGS. 1 to 3, an apparatus 10 of a hybrid urethane mixing system for producing a homogenous material from a mixture of a plurality of reactive components is shown. The apparatus 10 is comprised of four main portions: a mixing portion comprising of a mixer housing 11, having a rear mixing block 11a, and a front mixing block 11b, and a mixer body 12; a temperature control chamber 13 encompassing the mixer body 12; and, a nozzle assembly 14. The apparatus 10 utilizes a disposable plastic mixer element 16 (rotor). The apparatus 10 is designed to yield a more consistent product and enhanced temperature control for a urethane molding process for golf balls.

Advantageously, the present invention is directed to producing a flow moldable material from at least two castable urethane materials, such as polyurethanes, polyureas, and blends thereof. The materials need to be mixed, temperature controlled, and dispensed. In an embodiment of the invention, pumps (not shown) are provided to pump materials in pre-measured amounts into the apparatus through openings 17a and 17b, in the rear mixing block 11a wherein they have an initial mixing. The materials are then pumped through to the mixer body 12 which contains the disposable plastic mixer element (rotor) 16 that is rotated by attachment to a slotted drive shaft 18. It is in the mixer body 12 where the primary mixing takes place.

The front mixing block 11b has an internal groove 15 having four apertures 15a for quick disconnect to the mixer body 12. At the rear end of the mixer body 12 are four raised ridges 19 which when inserted into the internal groove 15 through the apertures 15a the connection is completed by merely rotating the mixer body 12, within the internal groove 15. The front mixing block 11b also has four corner sections 20 that inherently define a large opening for receiving the temperature control chamber 13 which has four raised lip sections 25 disposed about its outer perimeter for easy insertion into four internal slots 23 defined in the four corner sections 20 for a quick disconnect fitting therein. A drive shaft 18 has a leading end slotted to allow a relatively easy friction fit coupling to the disposable mixer element 16, which is dimensioned to fit within the slot of the drive shaft 18 without the use of tools. The dynamic mixer element 16 includes left and right hand helical elements that aggressively mix the material as the material is pumped through the mixer body 12. The mixer body 12 is surrounded by an outer sleeve which forms the temperature control chamber 13. Controlling the temperature is extremely necessary in order to control the heat generated by the exothermic reaction from the urethane components combining and mixing. For a cooling medium, water is introduced to the temperature control chamber 13 by a water inlet 28 in near proximity to the front mixing block 11b and is removed via a water outlet 29 near the other end of the temperature control chamber 13. The water temperature control chamber 13 provides uniform process temperatures in the mixer body 12 which minimize "plating out" (build-up of cured material) on the dynamic mixer element 16. With reduced plate-out, the rotor cycle time is increased and apparatus downtime is reduced.

A bracket assembly 26 consisting of an upper section 26a and a lower section 26b is clamped about the temperature control chamber 13 at the end nearer to the nozzle assembly 14, and is coupled together by simple hex screws. This bracket assembly 26 forms a base that is connected to one end of an extended arm portion 31 of the nozzle assembly 14. After the material passes through the mixer body 12, it is then forced out of the nozzle assembly 14 through two dispensing ports 21a and 21b, and dispensed into a ball mold cavity to be applied about a golf ball sub-assembly (not shown). The dispensing ports 21a and 21b are seated in a fixture 32 which is connected to the other end of the extended arm portion 31. The ports 21a and 21b are caused to move vertically into and out of the ball mold cavities by pneumatic pressure. This pressure propels a piston rod 33, housed within a tube 34, to move down into the golf ball mold cavity and gradually be raised out of the cavity as the castable polyurethane material is deposited in the mold cavity. The temperature control chamber 13 has at one end, near to the nozzle assembly 14, an insulating member 36 which is sandwiched between the temperature control chamber 13 and a relatively circle mounting member 37. The mounting member 37 has a slotted recess 38 defined therein, and the insulating member 36 and mounting member 37 are coupled to the chamber 13 by hex screws 39. The nozzle assembly 14 includes a dispensing tube housing 35 that holds the plastic tubing making up the dispensing tubes 21a and 21b. This is done by means of a simple hex screw 40. The dispensing tube housing 35 includes a pair of ears 41 which are inserted into the slotted recess 38 of the mounting member 37 by a simple quick disconnect motion by the operator which requires only a manual rotation of the ears 41 within the slotted recess 38.

The design of the mixing system minimizes exposure to urethane raw materials by utilizing tool-free, quick-change components. The turn-to-lock connections and the slotted rotor drive shaft 18 are design features that make the operator's mixer maintenance tasks quicker and more efficient. The development of the quick-change mixer assembly provides for a reduction in the downtime necessary to service the apparatus 10 which requires frequent changing of the disposable mixer element 16 and even more frequent changing of the plastic tubing making up the dispensing ports 21a and 21b of the nozzle assembly 14. The reduction in the mixer block mass allows for enhanced water temperature control along the entire length of the mixer rotor 16 resulting in better mixer performance and increased mixer life. Utilizing a disposable dynamic mixer element 16 eliminates the need for relatively expensive machined mixing rotors, which require significant cleaning and maintenance. When cleaning non-disposable rotors, workers are often exposed to cleaning chemicals and sensitive urethane materials. The present invention, in using the disposable dynamic mixer element 16, requires only that the mixer element 16 be periodically removed and discarded, and this generally eliminates any undesirable chemical exposure to workers. Frequent cleaning and repeated use of a permanent mixing rotor can often change the rotor mixing characteristics resulting in process variations due to rotor wear. The disposable dynamic mixer element 16 may be removed and replaced without the use of tools. This tool-free feature is very critical to the system, for in addition to the great reduction in downtime, it also eliminates the contamination of tools when such tools are required to service the mixer.

As shown in FIGS. 1 and 1a, the disposable plastic mixer element 16 generally is longer, smaller in diameter, and is less massive than non-disposable rotors. These features help to achieve improved temperature control. The mixer element 16 is disposed within a bore 22 that extends axially along the middle portion of the mixer body 12. The mixer element 16 is constructed of a predetermined number of segments which have right and left-hand helical twists, and extend axially along the bore 22. The segments are alternated and oriented such that one segment lies at 90° with respect to an adjacent segment. For example, one segment has an opposite helical twist and is shifted by a (radial) angle of 90° with respect to a preceding segment. Moreover, the mixer body 12 and the mixing segments define a tortuous mixing path which insure that the components are aggressively mixed The number of mixing segments comprising the dynamic mixer element 16 is dependent on the length of the bore 22. The extra length of the mixer element 16 provides increased surface area for better mixing, but also provides for greater surface contact for the cooling water flow. The relatively small diameter of the mixer element 16 and mixer body 12 improve forward material flow through the mixer (first in/first out). The temperature control of the mixing components results in an improved cure rate (gel) control, and produces improved material processing properties such as smooth flow and excellent shot cut-off. The gel rate time of the material flowing through the present invention is controlled such that the gel time will be at least 60 seconds, and preferably at least 70 seconds. The temperature of the urethane material is maintained at less than 180° F., preferably at less than 150° F. The dynamic mixer element 16 is available from Con-ProTec, Inc. of Salem, N.H. under the trade name "STRATOMIX"®.

The apparatus 10 is completed by a three hole packing gland 42 inserted into the back of the rear mixing block 11a and a lubricating chamber 43 and bearings 44 and 45 disposed within a bearing housing 46 support of the drive shaft 18. The bearing hosing having a two-hole packing gland 47 insulating it from the lubricating chamber 43. The apparatus 10 is made of parts that are generally stainless steel but it is appreciated that many various metals may be employed without affecting the structural integrity of the apparatus.

Figure 4:
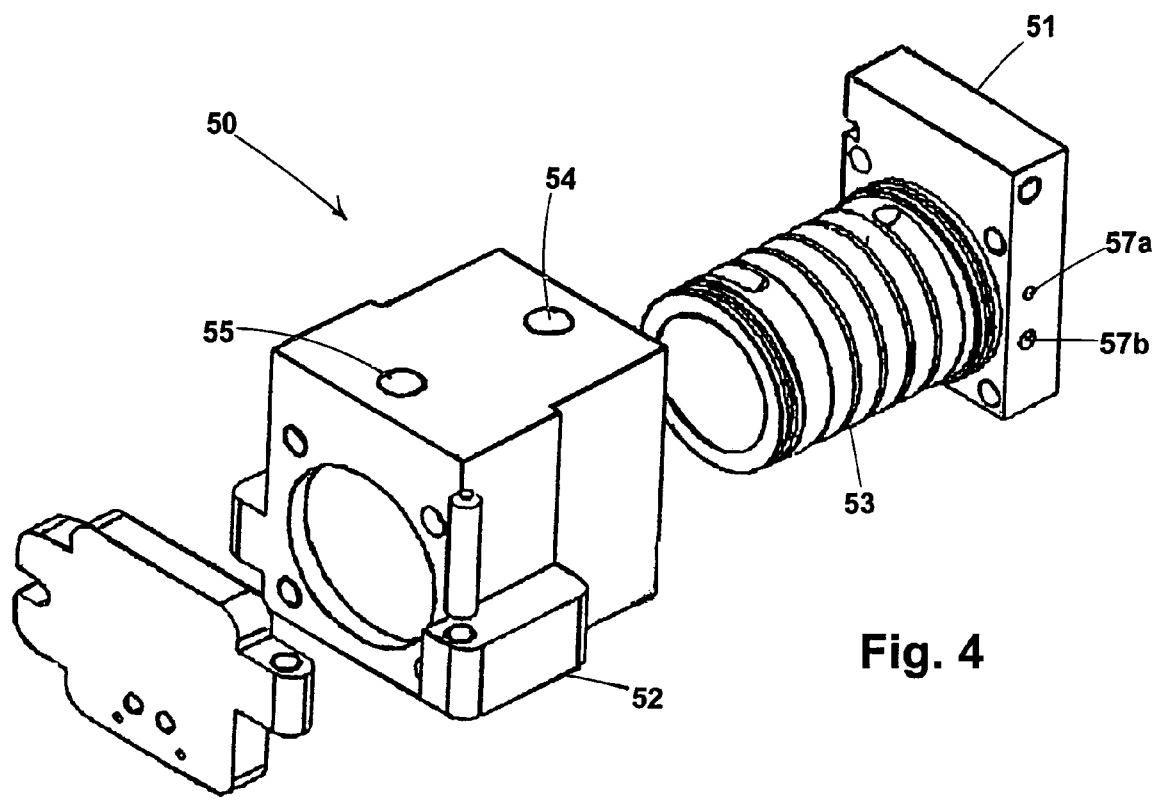
FIG. 4 is a perspective view of an embodiment of a temperature control chamber having a cooled mixer comprising a helical cooling channel.
Figure 5:
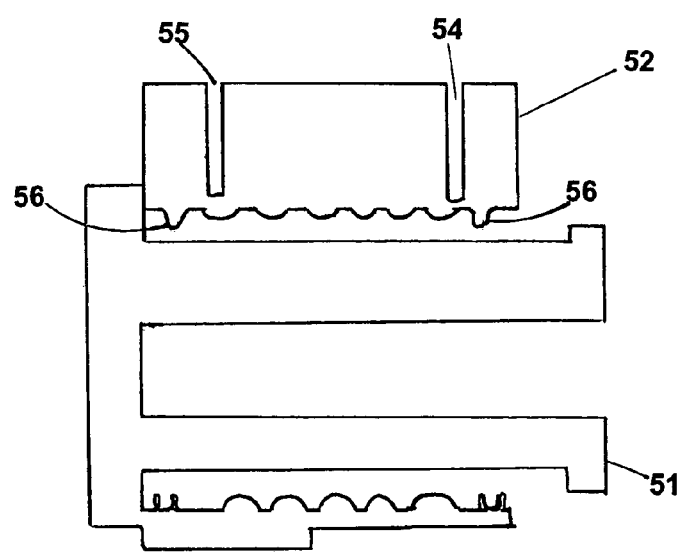
FIG. 5 is a cross section view of the cooled mixer of FIG. 4.

FIGS. 4 and 5 disclose another embodiment of a temperature control chamber. This embodiment includes a cooled mixer chamber 50 comprising a mixing housing 51 encased in a cooling jacket 52. A helical cooling channel 53 is spirally disposed about the mixing housing 51, with the mixing housing 51 having a helical groove contour that extends around the length of its outer perimeter and provides a track for placement of the helical cooling channel 53. The cooling jacket 52 has o-ring seals 56 disposed at each end to create a water tight seal between the jacket 52 and mixing housing 51. The helical cooling channel 53 has an inlet opening 54 for introducing cooling water and an outlet opening 55 for removal of the heated water after it has passed through the cooling channel 53. This provides positive and very efficient coolant flow over the length of the mixing housing 51. This embodiment is especially beneficial for use with castable polyurethanes which are introduced into the mixing housing through receiving ports 57a and 57b.

While it is apparent that the illustrative embodiments of the invention herein disclosed fulfill the objective stated above, it will be appreciated that numerous modifications and other embodiments may be devised by those skilled in the art.

Therefore, it will be understood that the appended claims are intended to cover all such modifications and embodiments which come within the spirit and scope of the present invention.

We claim:

1. An apparatus for mixing and dispensing of components for applying to a golf ball sub-assembly, the apparatus comprising:
   a mixing block for receiving at least two components;
   means for pumping the components through the mixing block;
   a mixer body having a middle portion defining a bore extending axially along its longitudinal axis, means for mixing the components;
   a temperature control chamber encompassing the mixer body for controlling heat generated by an exothermic reaction created by the components combining and mixing; and
   a nozzle assembly for dispensing the mixed components into a mold cavity, the nozzle assembly comprising:
   an extended arm portion having one end connected to a bracket assembly of the mixer body and the other end to a vertically reciprocating fixture that is responsive to a pneumatic pressure means;
   a dispensing tube housing removably connected to a mounting member attached to the mixer body;
   a pair of dispensing ports each having one end integral with the dispensing tube housing for receiving the mixed components, and an opposite end seated in the vertically reciprocating fixture, wherein the pneumatic pressure means causes the vertical lifting and lowering of the dispensing ports into mold cavities wherein the mixed components are deposited therein; and
   the pneumatic means comprises a piston rod that is connected to the fixture through the extended arm portion and activated by pressurized air, wherein the rod is biasly moved in a reciprocally vertical direction.

2. The apparatus according to claim 1, wherein the mixing means for the components comprises:
   a dynamic mixer element having a structure comprising of multiple segments at a 90 degree relationship to each other to therein create a tortuous mixing path for the components to pass through.

3. The apparatus according to claim 2, wherein the dynamic mixer element is formed of plastic material and is generally disposable.

4. The apparatus according to claim 2, wherein the dynamic mixer element is rotated by a drive shaft.

5. The apparatus according to claim 1, wherein the temperature control chamber comprises:
   a mixing housing having a helical cooling channel spirally about an outer perimeter and along a longitudinal length of the housing, the helical groove having inlet and outlet water openings for circulating cooling water about the housing; and
   a cooling jacket surrounding the mixing housing, the cooling jacket having an o-ring at each end to create a relatively tight seal with the housing.

* * * * *